(12) United States Patent
Tiberi et al.

(10) Patent No.: US 8,873,444 B2
(45) Date of Patent: Oct. 28, 2014

(54) METHOD IN A WIRELESS PROCESS CONTROL SYSTEM FOR REDUCING POWER CONSUMPTION, AND A CONTROLLER AND COMPUTER PROGRAM PRODUCTS

(71) Applicants: Ubaldo Tiberi, Avezzano (IT); Alf Isaksson, Vasteras (SE); Krister Landernas, Hallstahammar (SE)

(72) Inventors: Ubaldo Tiberi, Avezzano (IT); Alf Isaksson, Vasteras (SE); Krister Landernas, Hallstahammar (SE)

(73) Assignee: ABB Research Ltd. (CH)

( * ) Notice: Subject to any disclaimer, the term of this patent is extended or adjusted under 35 U.S.C. 154(b) by 121 days.

(21) Appl. No.: 13/726,327

(22) Filed: Dec. 24, 2012

(65) Prior Publication Data

US 2013/0107750 A1 May 2, 2013

Related U.S. Application Data

(63) Continuation of application No. PCT/EP2010/059028, filed on Jun. 24, 2010.

(51) Int. Cl.
| | |
|---|---|
| *G08C 17/00* | (2006.01) |
| *H04W 24/02* | (2009.01) |
| *G06F 1/32* | (2006.01) |
| *H04W 52/02* | (2009.01) |
| *H04Q 9/00* | (2006.01) |

(52) U.S. Cl.
CPC .............. *H04W 24/02* (2013.01); *G06F 1/3209* (2013.01); *H04Q 2209/883* (2013.01); *Y02B 60/50* (2013.01); *H04Q 2209/40* (2013.01); *H04W 52/02* (2013.01); *H04Q 9/00* (2013.01)
USPC ............................. 370/311; 370/318; 370/230

(58) Field of Classification Search
CPC . H04W 24/00; H04W 52/02; H04W 52/0203; H04W 84/12; H04L 43/50; H04L 43/0852; H04L 43/08; H04L 47/10; H04L 2012/5631; H04L 47/15; H04L 47/2441; H04L 47/70; H04B 17/003
USPC .......... 370/252, 241, 242, 230, 229, 318, 311
See application file for complete search history.

(56) References Cited

U.S. PATENT DOCUMENTS

| | | |
|---|---|---|
| 2004/0116786 A1* | 6/2004 | Iijima et al. .................. 600/301 |
| 2006/0238332 A1 | 10/2006 | Carle et al. |
| 2009/0105567 A1 | 4/2009 | Smith et al. |

FOREIGN PATENT DOCUMENTS

| | | |
|---|---|---|
| EP | 1422677 A2 | 5/2004 |

OTHER PUBLICATIONS

SPIE Int'l Symposium, Power Management for Energy Harvesting Wireless Sensors, Mar. 9, 2005.*

(Continued)

*Primary Examiner* — Dady Chery
(74) *Attorney, Agent, or Firm* — St. Onge Steward Johnston & Reens LLC

(57) ABSTRACT

A method in a wireless process control system for reducing power consumption of a sensor node of the wireless process control system. The wireless process control system further includes a controller in wireless communication with the sensor node wherein the sensor node is in a sleep mode. The method includes the steps of: predicting based on an error signal, when sensor measurement data is needed from the sensor node and determining an instant of time for communication between the controller and the sensor node based thereon; and the sensor node re-entering the sleep mode. The invention also relates to computer program products and a controller.

10 Claims, 2 Drawing Sheets

(56) References Cited

OTHER PUBLICATIONS

Sidra et al. Power Consumption in Wireless Sensor Networks, Dec. 2009.*
International Preliminary Report on Patentability Application No. PCT/EP2010/059028, Date: Sep. 20, 2012, 14 pages.
International Search Report and Written Opinion of the International Searching Authority Application No. PCT/EP2010/059028 Completed: Mar. 8, 2011; Mailing Date: Mar. 15, 2011, 10 pages.
Written Opinion of the International Preliminary Examining Authority Application No. PCT/EP2010/059028, Mailing Date: Jun. 26, 2012, 8 pages.

* cited by examiner

METHOD IN A WIRELESS PROCESS CONTROL SYSTEM FOR REDUCING POWER CONSUMPTION, AND A CONTROLLER AND COMPUTER PROGRAM PRODUCTS

FIELD OF THE INVENTION

The invention relates generally to the field of process control systems, and in particular to wireless process control systems.

BACKGROUND OF THE INVENTION

In a typical industrial production comprising automated processes, such as petrochemical, chemical or pharmaceutical processing systems, pulp and paper production systems or power plants, a process control system is used in order to monitor various process variables and control the processes accordingly. For example, a process variable such as the fluid level of a tank or the temperature of a fluid in a process step may give rise to a certain control action, for example opening of a valve. Different sensor devices and actuators are used for this end and sensor data is transmitted in hardwired communication networks to a controller regulating the processes. Several such controllers may be interconnected and also connected to supervisory control work stations wherein users or operators may supervise and control the processes.

The above hardwired process control system design involves installing communication cables, which is labour intensive and costly. Further, should there arise a need for installing additional sensor devices, e.g. if a new process step is introduced, more cumbersome and expensive communication cable installation is required, as in case of a need to replace existing communication cables. Further yet, the communication wiring is expensive also in terms of material and may degrade over time.

An alternative to the above described process control systems could therefore be to introduce wireless control in the process industry. The introduction of a wireless process control system requires careful consideration. One issue is the reliability of data transfer, and another the battery power supply of the wireless nodes of the process control system. There may be a trade-off between these two issues in that the data transfer reliability in some instances requires many messages to be sent, which result in a high traffic load and thus shortened battery life time of the wireless devices.

As a particular example it can be mentioned that several parts of the wireless process control system are typically not synchronized. Many tasks need execution in order for sensor data to reach the intended control application and several of these tasks are not synchronized. Known solutions comprise the use of equidistant sampling and periodical transmission of the information from the sensor device to the process control system. Delays can be compensated for by the control application using time stamp information. A drawback is the frequent synchronization messages required by such accurate time stamps, which increases the traffic load and depletes the battery. Alternatively expensive clock circuitry could be used in the wireless sensor devices, but this would increase the overall costs of the process control system. Further, equidistant sampling results in high traffic load during steady state when the periodic transmissions are performed even though no control action is needed.

SUMMARY OF THE INVENTION

In view of the above, it is a general object of the invention to provide improved wireless control overcoming or at least alleviating the above-mentioned drawbacks of the prior art.

It is particular object of the invention to provide a wireless control method having a balanced trade-off between reliability of communication on one hand and power consumption of wireless nodes on the other hand.

These objects, among others, are achieved by a wireless control method for reducing power consumption of wireless sensor nodes.

In accordance with the invention a method in a wireless process control system is provided for reducing power consumption of a sensor node of the wireless process control system. The wireless process control system further comprises a controller in wireless communication with the sensor node, and the sensor node is in a sleep mode. The method comprises the steps of predicting based on an error signal, when sensor measurement data is needed from the sensor node and determining an instant of time for communication between the controller and the sensor node based thereon; and instructing the sensor node to re-enter the sleep mode. By means of the invention, and in particular by the enabled sleep mode, the power consumption of at least the wireless sensor nodes is decreased and the battery life time correspondingly increased.

In accordance with another embodiment of the invention, the controller performs the step of predicting and then further provides information to the sensor node about the instant of time, for enabling the sensor node to timely perform a required sensor measurement.

In accordance with another embodiment of the invention, the step of predicting comprises comparing historical measurement data to set reference data, thereby providing the error signal. A reliable yet readily implemented way of obtaining the required error signal is thus provided. The error signal may be extrapolated and the instant of time may be determined based on such extrapolated error signal.

In accordance with yet another embodiment of the invention, the wireless communication comprises use of a time-slotted communication protocol. A conventional scheduled wireless communication scheme may thus be used, wherein time slots can be dedicated to particular sensor nodes in a predictable manner. A prerequisite for a reliable communication is thereby provided, in that the sensor nodes have dedicated communication channels for data transfer use.

In accordance with still another embodiment of the invention, the step of providing time information to the sensor node comprises the controller informing the sensor node about which time slot to use for a next-coming communication occasion. In the time-slotted scheme, a particular sensor node can skip the use of a number of time slots dedicated to it in case the error signal based prediction indicates that there is no such need. Decreased communication occasions between the controller and the sensor node is thus obtained and thereby increased battery life time.

In accordance with an embodiment of the invention, the method comprises the further steps of: determining, in the sensor node, that a threshold value has been exceeded; and transmitting, at an available communication occasion, a measurement value to the controller. This feature provides an increased process control security in that disturbances can be detected more rapidly. The available communication occasion may comprise a non-used time slot of the time-slotted communication connection.

In accordance with an embodiment of the invention, the step of instructing the sensor node to enter a sleep mode comprises the sensor node receiving the time information and thereupon automatically entering the sleep mode. Upon the sensor node receiving the time information, it performs the sensor measurement and thereafter automatically enters the sleep mode.

In accordance with an embodiment of the invention, the method comprises the further steps of obtaining, in the controller, information about latency in the wireless process control system; and adjusting the instant of time accordingly. An increased accuracy is thus obtained.

The invention further relates to a controller in such wireless process control system and to computer program products, whereby advantages corresponding to the above are achieved.

Further features and advantages will become clear upon reading the following description and the accompanying drawings.

DETAILED DESCRIPTION OF THE INVENTION

Figure 1:
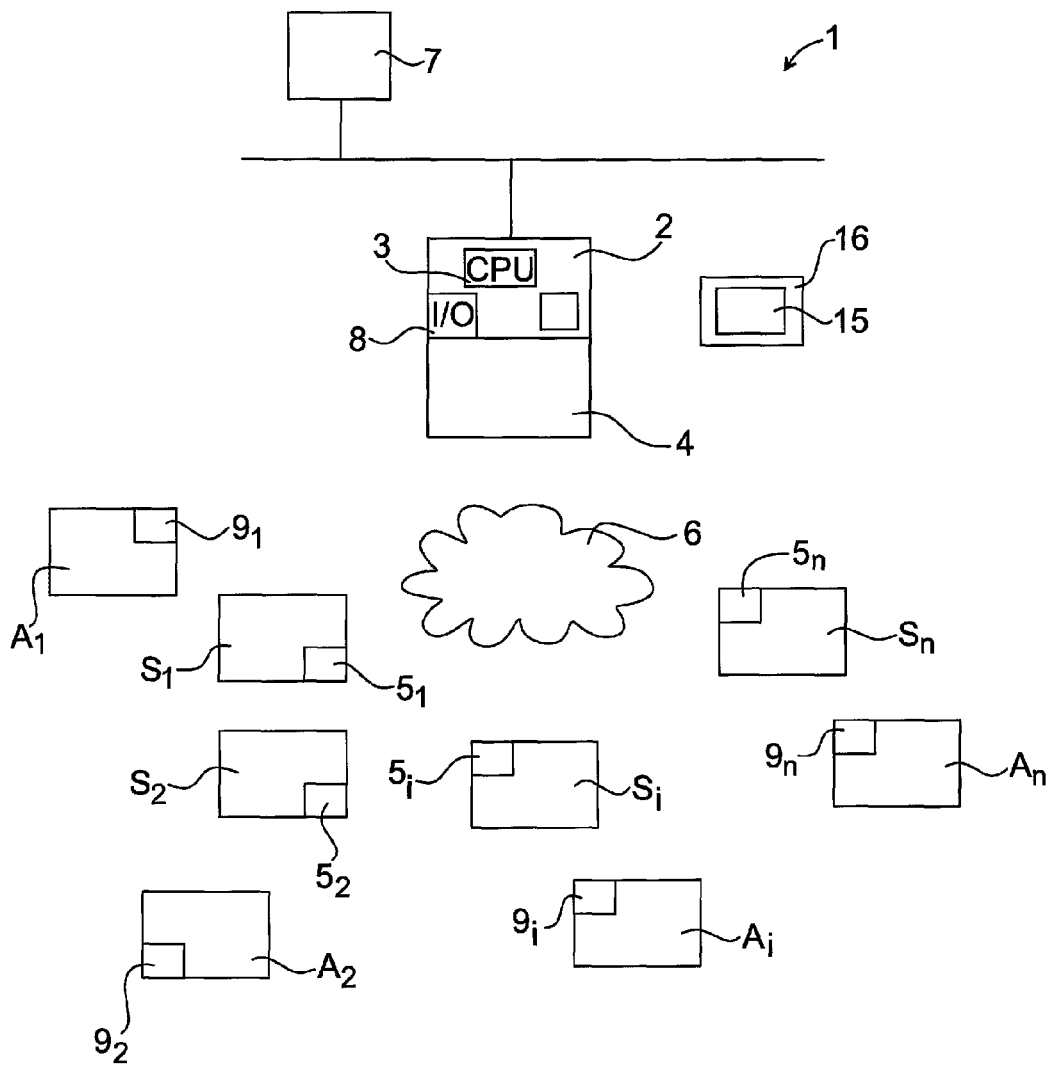
FIG. 1 illustrates a wireless process control system in which the present invention may be implemented.

FIG. 1 illustrates a wireless process control system 1 in an automation system which may benefit from the present invention and for which the invention may be implemented. The wireless process control system 1 comprises one or more controller(s) 2 (only one illustrated) controlling some processes within the automation system. The controller 2 may be any suitable controller, such as for example a process controller or a programmable logic controller (PLC).

The controller 2 comprises an Input/Output arrangement 8 for inputting and outputting process related variables in order to control the automation system.

The controller 2 further comprises processing means 3 for processing input data and means for outputting control signals for controlling processes within the automation system. The processing means 3 may comprise a central processing unit (CPU) executing the instructions of control applications, and having a memory for storing instructions and data. A control application, also denoted control program, cyclically reads the values of process inputs and external variables (for example values from another controller), performs calculations based on these values and also on the values of internal variables (for example values obtained during processing or internal states) and generates as a result values to process outputs and also to external variables. Each such execution is called a scan cycle or task scan. The CPU 3 is also responsible for communication with other devices (not shown) and the execution of instructions of the control applications.

The controller 2 further comprises, or is connected to, communication means 4, such as a transceiver and antenna, for enabling wireless communication and wireless transfer of data required in the control. Such communication means 4 may further comprise a gateway interfacing a control centre 7 comprising work stations that enable supervision by a user. Such gateway further interfaces a wireless network 6 and comprises the necessary hardware, software and firmware in any combination.

A number of sensor nodes $S_1, S_2, \ldots, S_i, \ldots, S_n$ are arranged in the automation system to be controlled. In particular, a sensor node $S_i$ may comprise a temperature sensor arranged to sense the temperature of a certain part of the automation process. Other, but non-exhaustive, examples of sensor nodes comprise pressure sensors, flow sensors, concentration measuring sensors etc. Each sensor node $S_1, S_2, \ldots, S_i, \ldots, S_n$ further comprises communication means $5_1, 5_2, \ldots, 5_i, \ldots, 5_n$, such as a transceiver and an antenna, to enable wireless communication with the controller 2.

The automation system further comprises a number of actuators $A_1, A_2, \ldots, A_i, \ldots, A_n$. The sensor node $S_i$ is typically arranged at a process step to be controlled and the actuator $A_i$ is arranged to perform a certain action in response to received control signals.

As an example, the sensor node performs a fluid level measurement of a tank and sends this data to the controller 2. The controller 2 in turn processes the data and determines whether any control action is required. If there is, then the controller 2 transmits control signals to this end to the actuator, which in turn e.g. opens a valve for adjusting the tank level. The actuator may for example comprise a valve, a pump, heating element or motor etc.

In an embodiment, also the actuators $A_1, A_2, \ldots, A_i, \ldots, A_n$ comprise communication means $9_1, 9_2, \ldots, 9_i, \ldots, 9_n$ by means of which control signalling between the controller 2 and the actuators $A_1, A_2, \ldots, A_i, \ldots, A_n$ are exchanged.

The use of the communication means $5_1, 5_2, \ldots, 5_i, \ldots, 5_n$ of the sensor nodes $S_1, S_2, \ldots, S_i, \ldots, S_n$ and/or the communication means 4 of the controller 2 and/or the communication means $9_1, 9_2, \ldots, 9_i, \ldots, 9_n$ of the actuators $A_1, A_2, \ldots, A_i, \ldots, A_n$, consumes much battery power, thus shortening the battery life time of the wireless sensor nodes and/or the actuators and/or the controller 2, and should therefore be minimized.

In accordance with the invention, the time instant when a measurement value is needed is determined based on a prediction. In particular, in accordance with the invention, a method is provided, by means of which the above desire to minimize the wireless communication and thereby the power consumption is made possible.

Figure 2:
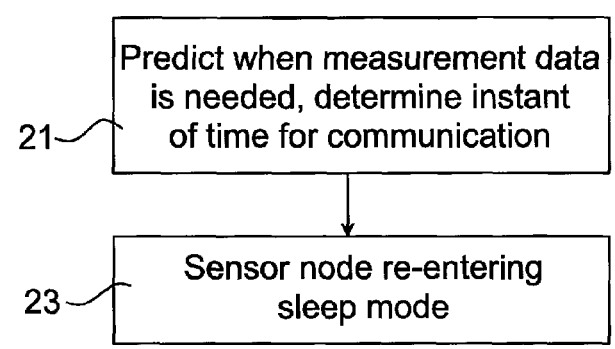
FIG. 2 illustrates steps of a method in accordance with the present invention.

With reference now to FIG. 2, a method 20 in the wireless process control system 1 is provided for reducing power consumption of the sensor node $S_1, S_2, \ldots, S_i, \ldots, S_n$. The sensor node $S_1, S_2, \ldots, S_i, \ldots, S_n$ is in a sleep mode. The method 20 comprises the first step of predicting 21 when sensor measurement data is needed from the sensor node $S_1, S_2, \ldots, S_i, \ldots, S_n$. This step may be performed in the controller 2, or in the sensor node $S_1, S_2, \ldots, S_i, \ldots, S_n$. In case the controller 2 performs the step, the sensor node may be provided with less intelligence; in case the sensor node performs the step, intelligence is needed for effectuating this, i.e. some processing means is then required in the sensor node.

The prediction is based on an error signal. The method further comprises determining an instant of time for communication between the controller 2 and the sensor node $S_1, S_2, \ldots, S_i, \ldots, S_n$ based on the prediction.

In an embodiment, in case the controller 2 performs the first step, the method 20 comprises a sub-step of providing, from the controller 2, information to the sensor node $S_1, S_2, \ldots, S_i, \ldots, S_n$ about the instant of time determined in the first step, thereby enabling the sensor node to timely perform a required sensor measurement. The sensor node is enabled to wake up in time from its low power sleep mode in order to perform the measurement.

The method 20 comprises the second step of instructing 22 the sensor node $S_1, S_2, \ldots, S_i, \ldots, S_n$ to re-enter the sleep mode. The sensor node is thus in a low power consuming mode most of the time, waking up only to deliver the required measurement data. This step may, but need not, be performed by the controller 2.

Figure 3:
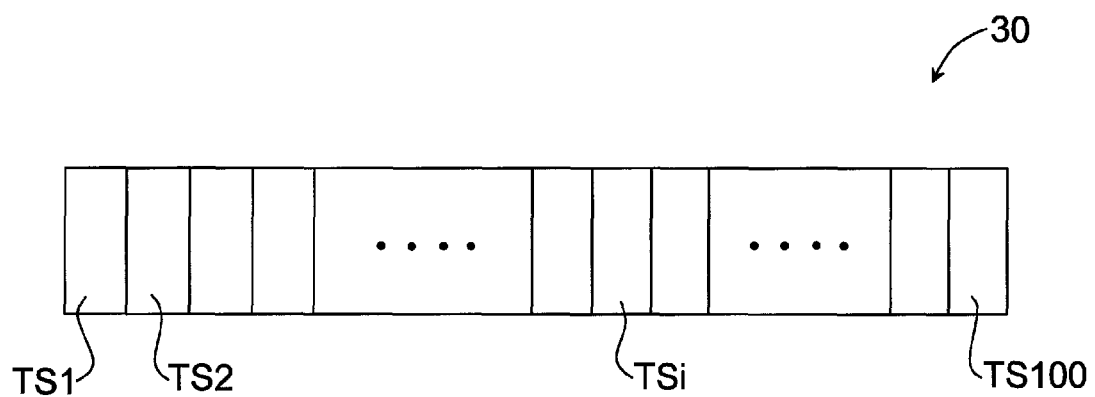
FIG. 3 illustrates schematically a time-slotted communication protocol used in an embodiment of the invention.

The method can be seen as a self-triggered approach and is in an embodiment implemented in a time-slotted communication scheme. FIG. 3 illustrates schematically a time-slotted communication protocol. A time frame 30 may comprises e.g. 100 time slots TS1, TS2, . . . TS100. The self-triggered mode comprises in an embodiment of the invention a scheduled communication, wherein the sensor nodes $S_1, S_2, \ldots, S_i, \ldots, S_n$ communicate in dedicated slots. For example, every $12^{th}$ slot is dedicated for communication by sensor node $S_1$, every $12^{th}$ is dedicated for communication by sensor nod $S_2$ etc. The number of slots dedicated to the different sensor nodes need not be equal; a highly prioritized sensor node may be given more slots than a less prioritized sensor node.

In accordance with the invention, the sensor nodes $S_1, S_2, \ldots, S_i, \ldots, S_n$ may not need to use all of their respective dedicated communication time slots. Instead, if it can be determined that during a certain period of time, no new measurement data is needed from a sensor node $S_i$, this sensor node $S_i$ can go into a sleep mode, thereby saving battery power. Further, the communication means 4 of the controller 2 may in some cases also go into a such sleep mode. In particular, the step of the controller 2 providing 22, information to the sensor node $S_1, S_2, \ldots, S_i, \ldots, S_n$ about the instant of time, may then comprise information about which time slot to use, of the time slots dedicated to the particular sensor node, or, equivalently, how many of the next-coming dedicated time slots that can be skipped. The controller 2 may inform the sensor node to remain in sleep mode during e.g. the next five dedicated time slots.

Figure 4:
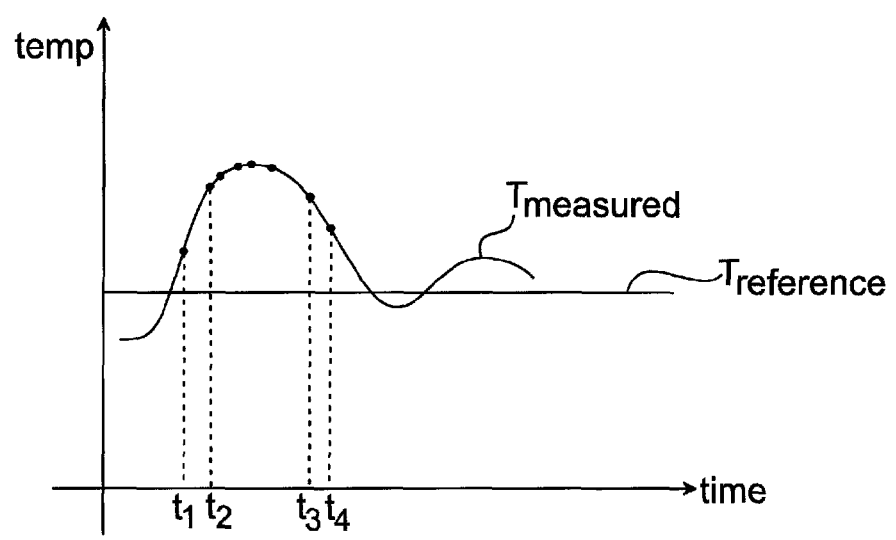
FIG. 4 illustrates a model graph of a process over time.

FIG. 4 illustrates an example of how the above method can be implemented and in particular a model of a process over time is shown. The sensor node $S_i$ in question may for example comprise a temperature sensing device, measuring the temperature in or at a certain process step. The FIG. 4 illustrates a graph, having time along the horizontal axis and temperature along the vertical axis. A model over the process to be controlled is provided, in particular providing reference values for a steady state operation over time. The reference values, or setpoints of a process values in question, are in the figure indicated in a graph $T_{reference}$. Measurement values are indicated in a graph $T_{measured}$. The model of the process development over time can for example be obtained based on experience, on theoretical models, on historical values, on extrapolations, on trial and error methods, on experimental data obtained during a control session wherein the process is manually controlled in an actual process run or any combination thereof.

The prediction of when sensor node measurement data is needed may be provided by an error signal that is obtained by comparing the historical measurement data to the set reference data. The error signal may then be extrapolated in order to determine the instant of time when next measurement data is needed.

As an example, at time instants $t_1$ and $t_2$ the sensor node $S_i$ performs measurements. As the measured values, i.e. the temperature of the illustrated example, has increased rather a lot and deviates more and more from the model graph $T_{reference}$, the prediction, based on the error signal, for the next-coming time instants when to perform measurements, would be time instants more frequently set. That is, an increased number of communication occasions between the controller 2 and the sensor node $S_i$ would be set. When the measurement values decrease and the error signal thus decreases, the communication occasions can be fewer again.

It is noted that the above example is provided purely as a way to describe the invention and that other error signals may be used. As another example, the error signal may be based on historical error signals or other historical data.

Advantages of the above embodiment comprise decreased number of communication occasions between the controller 2 and the sensor nodes $S_1, S_2, \ldots, S_i, \ldots, S_n$, and thereby the decreased use of battery power and thus prolonged battery life time. This advantage is brought about by the fact that the sensor nodes $S_1, S_2, \ldots, S_i, \ldots, S_n$ is allowed to enter a sleep mode owing to the use of scheduled communication time slots.

Another advantage of the self-triggered mode is that the intelligence can essentially be located in the controller 2, i.e. be centrally controlled, while the sensor nodes $S_1, S_2, \ldots, S_i, \ldots, S_n$ can comprise no or less intelligence. However, intelligence can be provided in the sensor nodes as well, thereby requiring lessened communication in that the controller 2 does not need to communicate to the sensor node the instant of time at which the next measurement is required. The sensor node comprising some intelligence can perform the prediction step itself, as mentioned earlier.

Yet another advantage of the above described self-triggered approach is that the controller 2 comprises knowledge on when a next communication occasion with a specific sensor node is to occur. In case of communication failures between the controller 2 and the sensor node, i.e. in case that an expected communication message from the sensor node is not received at the controller 2, the controller 2 can take appropriate action. For example, an alarm signal may be provided alerting an operator about the situation and the controller 2 possibly using non-updated measurement values from that particular sensor node.

Yet another advantage is described in the following. In some communication specifications, such as WirelessHART, it is mentioned that sensor nodes should be able to provide data to the controller 2, not directly to the controller, but via another sensor node. This specification can be met by means of the self-triggered approach of the invention. In particular, in a multi-hop control situation, wherein one sensor node $S_i$ communicates with the controller 2 through another sensor node $S_{i+1}$, the self-triggered approach may readily be implemented. The sensor node $S_i$ transmitting or receiving a message and the sensor node $S_{i+1}$ through which the message is conveyed to the controller 2 both know when to expect a communication occasion and can thus be in the sleep mode when no communication is imminent. In contrast, in for example an event-based system, the conveying sensor node $S_{i+1}$ would have to be awake as it would not know when the other sensor node $S_i$ needs to communicate with the controller 2.

In another embodiment of the invention, an event based feature is added. The sensor node $S_1, S_2, \ldots, S_i, \ldots, S_n$ is provided with some intelligence for enabling it to wake up and perform a measurement. The measurement result is compared to a threshold value and based on this comparison a decision is taken, in the sensor node $S_1, S_2, \ldots, S_i, \ldots, S_n$, whether communication is to be initiated with the controller 2.

The method then comprises the further steps of determining, in the sensor node $S_1, S_2, \ldots, S_i, \ldots, S_n$, that a threshold value has been exceeded; and transmitting, at an available communication occasion, a measurement value to the controller 2. Such available communication occasion comprises, in an embodiment of the invention, an empty time slot of the time-slotted communication scheme.

Advantages of the event-based mode comprise the possibility of the sensor nodes and the communication means of the controller to enter a sleep mode and sleep as long as the processes run at steady state. Further, an increased security is obtained in that possible disturbances in a process may be detected more rapidly and action for combating the disturbances can hence be taken more quickly.

The above description of the communication between the sensor node $S_1, S_2, \ldots, S_i, \ldots, S_n$, and controller 2 may be applied in an analogous manner for the communication between the controller 2 and the actuator $A_1, A_2, \ldots, A_i, \ldots, A_n$. That is, the actuator may be wirelessly controlled. Communication wiring may then be eliminated also between the controller and the actuator, and advantages of a wireless control system corresponding to the above are obtained.

The invention also encompasses computer program product 15 stored on a computer readable storage medium 16, comprising computer readable program code means for causing a controller 2 of a wireless process control system 1, to carry out the method as described.

The invention further encompasses the controller 2 as described, for controlling processes within an automation system comprising a sensor node $S_1, S_2, \ldots, S_i, \ldots, S_n$. In particular, the controller 2 comprises means 3 for predicting, based on an error signal, when sensor measurement data is needed from the sensor node $S_1, S_2, \ldots, S_i, \ldots, S_n$ and determining an instant of time for communication between the controller 2 and the sensor node $S_1, S_2, \ldots, S_i, \ldots, S_n$ based thereon, and means 3, 4 for instructing the sensor node $S_1, S_2, \ldots, S_i, \ldots, S_n$ to re-enter the sleep mode. The controller 2 may further comprise means 4 for providing information to the sensor node $S_1, S_2, \ldots, S_i, \ldots, S_n$ about the instant of time, for enabling the sensor node to timely perform a required sensor measurement. This means should be included for example when the sensor node is a low-intelligence device.

What is claimed is:

1. A method in a wireless process control system for reducing power consumption of a sensor node of said wireless process control system, said wireless process control system further comprising a controller comprising communication means for enabling wireless communication with said sensor node, wherein said sensor node is in a sleep mode, said method comprising the steps of:
    predicting based on an error signal, when sensor measurement data is needed from said sensor node and determining an instant of time for communication between said controller and said sensor node based thereon, enabling the sensor node to timely wake up from its sleep mode, wherein predicting comprises comparing historical measurement data to set reference data, performing, in the sensor node, a required sensor measurement, the measurement further comprising: comparing the measurement result to a threshold value, determining, in said sensor node, that the threshold value has been exceeded, and transmitting, in an empty time slot of a time-slotted communication protocol, a measurement value to said controller, and
    said sensor node re-entering said sleep mode.

2. The method as claimed in claim 1, wherein said step of predicting is performed in said controller.

3. The method as claimed in claim 1, wherein said step of predicting comprises extrapolating the error signal based on said historical measurement data and said set reference data in order to determine the instant of time when next measurement data is needed.

4. The method as claimed in claim 1, wherein said wireless communication comprises use of a time-slotted communication protocol.

5. The method as claimed in claim 4, wherein said step of providing time information to said sensor node comprises said controller informing said sensor node about which time slot to use for a next-coming communication occasion.

6. The method as claimed in claim 1, wherein said step of said sensor node re-entering a sleep mode comprises said sensor node obtaining said instant of time and upon completed sensor measurement automatically entering said sleep mode.

7. The method as claimed in claim 1, comprising the further steps of obtaining, in said controller, information about latency in the wireless process control system; and adjusting said instant of time accordingly.

8. A computer program product stored on a non-transitory computer readable storage medium, comprising computer readable program code means for causing a controller of a wireless process control system, to carry out a method in a wireless process control system for reducing power consumption of a sensor node of said wireless process control system, said wireless process control system further comprising a controller comprising communication means for enabling wireless communication with said sensor node, wherein said sensor node is in a sleep mode, said method comprising the steps of:
    predicting based on an error signal, when sensor measurement data is needed from said sensor node and determining an instant of time for communication between said controller and said sensor node based thereon, enabling the sensor node to timely wake up from its sleep mode, wherein predicting comprises comparing historical measurement data to set reference data, performing, in the sensor node, a required sensor measurement, the measurement further comprising: comparing the measurement result to a threshold value, determining, in said sensor node, that the threshold value has been exceeded, and transmitting, in an empty time slot of a time-slotted communication protocol, a measurement value to said controller, and
    said sensor node reenter said sleep mode.

9. A controller for controlling processes within an automation system comprising a sensor node, the controller comprising communication means for enabling wireless communication with said sensor node, wherein said sensor node is in a sleep mode, said controller comprising:
    means for predicting, based on an error signal, when sensor measurement data is needed from said sensor node performing the measurement further which further comprising: comparing the measurement result to a threshold value, determining, in said sensor node, that the threshold value has been exceeded, and transmitting, in an empty time slot of a time-slotted communication protocol, a measurement value to said controller; and determining an instant of time for communication between said controller and said sensor node based thereon, enabling the sensor node to timely wake up from its sleep mode, wherein predicting comprises comparing historical measurement data to set reference data, and
    means for instructing said sensor node to re-enter said sleep mode.

10. The controller as claimed in claim 9, further comprising means for providing information to said sensor node about said instant of time, for enabling said sensor node to timely perform a required sensor measurement.

* * * * *